United States Patent [19]

Höhner et al.

[11] Patent Number: 5,387,467
[45] Date of Patent: Feb. 7, 1995

[54] METHOD FOR MODIFYING THE SURFACE OF FINELY DIVIDED PARTICLES BY THE APPLICATION OF ORGANOFUNCTIONAL POLYSILOXANES

[75] Inventors: Werner Höhner, Velbert; Dietmar Schaefer, Hattingen, both of Germany

[73] Assignee: Th. Goldschmidt AG, Essen, Germany

[21] Appl. No.: 984,752

[22] Filed: Dec. 3, 1992

[30] Foreign Application Priority Data

Dec. 11, 1991 [DE] Germany .............................. 4140794

[51] Int. Cl.$^6$ .............................................. B32B 25/20
[52] U.S. Cl. ..................................... 428/391; 428/403; 428/405; 428/407; 523/212; 523/214; 427/387
[58] Field of Search ................... 428/407, 391, 405; 523/212, 214; 427/387

[56] References Cited

U.S. PATENT DOCUMENTS

| | | | |
|---|---|---|---|
| 3,112,333 | 11/1963 | Bailey | 556/439 |
| 3,493,425 | 2/1970 | Campbell | 428/391 |
| 3,565,851 | 2/1971 | Nevroth | 523/212 |
| 3,729,444 | 4/1973 | Bey et al. | 556/439 |
| 4,322,473 | 3/1982 | Hafner et al. | 428/391 |
| 4,801,445 | 1/1989 | Fukui et al. | 428/405 |

FOREIGN PATENT DOCUMENTS

| | | |
|---|---|---|
| 0231322 | 6/1989 | European Pat. Off. . |
| 0373426 | 6/1990 | European Pat. Off. . |
| 2244489 | 12/1991 | United Kingdom . |

OTHER PUBLICATIONS

*Taschenbuch der Kunststoff*, edited by Dr. R. Gachter et al., "Farbmittel" by Dr. W. Damm et al pp. 734–736, 1990.

*Tachenbuch der Kunststoff*, edited by Dr. R. Gachter et al. "Fullstoffe und Verstarkungsmittel" by Dr. H. P. Schlumpf pp. 613–617, 1990.

*Primary Examiner*—Ralph H. Dean
*Attorney, Agent, or Firm*—Anderson Kill Olick & Oshinsky

[57] ABSTRACT

A method for modifying the surface of finely divided particles, such as pigments and filler or glass fiber, is described. The method utilizes organopolysiloxanes with ester groups and long-chain alkyl groups, which are linked over carbon atoms to silicon atoms.

4 Claims, No Drawings

METHOD FOR MODIFYING THE SURFACE OF FINELY DIVIDED PARTICLES BY THE APPLICATION OF ORGANOFUNCTIONAL POLYSILOXANES

FIELD OF INVENTION

The invention relates to a method for modifying the surface of finely divided particles, such as pigments and fillers, or of glass fibers by applying organopolysiloxanes with ester groups and long-chain alkyl groups, which are linked over carbon atoms to silicon atoms.

BACKGROUND INFORMATION AND PRIOR ART

It is well known that the properties of pigments and fillers can be improved by the application of organosilicon compounds on their surfaces. Such a coating procedure is intended to facilitate the incorporation and dispersion of the pigments or fillers in lacquers, dispersion paints, plastics, toners, building materials, enamels, etc. Moreover, the agglomeration of pigments and fillers during storage and processing is avoided by such a coating process with organosilicon compounds. It is furthermore desirable to reduce the production and accumulation of dust during the storage of pigments and fillers.

This state of the art is summarized in EP-A-0 373 426 (A2). EP-A-0 373 426 describes inorganic colored pigments and magnetic pigments containing at least 0.1 percent by weight and at most 5 percent by weight of one or several polyorganosiloxanes, which have a viscosity of 100 to 100,000 mPa×sec and a relative molecular weight of 500 to 500,000, contain no reactive or cross linking groups and contain per molecule at least one Si-alkyl and/or Si-aryl group with 9 to 25 carbon atoms, these groups being present to the extent of 7 to 70 percent by weight in the polyorganosiloxane and the remaining organic groups having 1 to 8 carbon atoms in the polyorganosiloxane.

Admittedly, the organosilicon compounds named in the aforementioned EP-A-O 373 426 are suitable in many cases for coating colored pigments. However, they frequently fail with fillers, such as magnesium or aluminum oxides or their oxide hydrates. A better dispersibility of the coated particles and a better adhesion of the coating to the surface of the particles are also frequently desired.

The British Patent GB 2,244,489 claims a filler which is provided with a layer of cross-linked silicone elastomers linked chemically to the surface of the inorganic core. It is evident from the examples cited there that, to begin with, highly cross-linked silicone elastomers with a plurality of reactive SiOH groups (also referred to as rubbery reactive silicones) are produced, which, after being applied on the inorganic filler, must be cured on this filler for 4 hours at 250° C. The silicone elastomer is the product of a cross linking reaction between a "multifunctionally terminated" polysiloxane and a silane cross linking agent. These coating materials are cross-linked elastomers intended to improve the mechanical properties of filled polymers, such as extensibility and tenacity.

In European patent application 0 321 322, magnetizable particles are described, which are in a matrix of a cross linked organopolysiloxane. The polysiloxane matrix is produced by the hydrosilylation of vinyl siloxanes with hydrogensiloxanes in the presence of magnetizable particles. The vinylsiloxane or hydrogensiloxane can optionally contain further reactive or also unreactive groups and optionally also iogenic groups, which are linked through an Si—C bond to a silicon atom. Good dispersibility in aqueous systems is said to be achieved with the magnetizable composite particles described there. The coated, magnetizable particles find application in medicine, biology and diagnosis.

The present invention is concerned with the technical problem of finding organosilicon compounds, which are suitable as universally as possible for coating finely divided particles of various types, particularly also of fillers. Moreover, the coated particles should have good application properties, such as an improved dispersibility and improved compatibility in organic media, such as lacquers, plastics, mineral oils, synthetic oils, vegetable oils or plasticizers. The coating shall adhere well to the surfaces of the particles so that permanence of the properties is ensured.

EP-A-0 373 426 teaches that the organopolysiloxane should be free of reactive groups. Surprisingly, it was found that the organopolysiloxanes show improved properties as coating materials on pigments and fillers especially when, in departure from the teachings of EP-A-0 373 426, groups which have a certain, graded reactivity, are linked in the siloxane molecule to silicon atoms.

OBJECT OF THE INVENTION

An object of the invention is a method for modifying the surface of finely divided particles, such as pigments and fillers or of glass fibers, by applying organopolysiloxanes with ester groups and long-chain alkyl groups linked over carbon atoms to silicon atoms and having the general formula

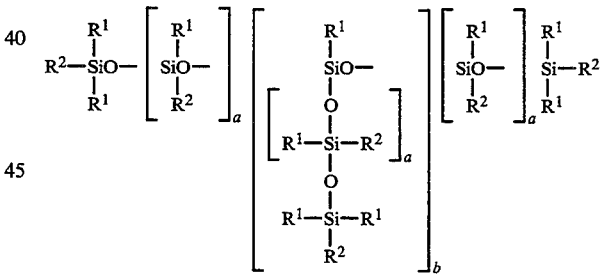

wherein
$R^1$ is an alkyl group with 1 to 4 carbon atoms or a phenyl group, at least 90% of the $R^1$ groups, however, being $CH_3$ groups,
$R^2$ is identical with $R^1$ to the extent of 50 to 99% and is $R^3$ and $R^4$ to the extent of 1 to 50%,
$R^3$ being a group having the formula —$(CH_2)_n$—CO—$OR^5$
$R^5$ being an alkyl group with 1 to 4 carbon atoms
n being a number from 3 to 20 and
$R^4$ being a linear or branched alkyl group with 6 to 30 carbon atoms,
the ratio of the $R^3$ group to the $R^4$ group falling within the range of 1:25 to 10:1, with the proviso that at least one $R^3$ group and at least one $R^4$ group must be present in the average molecule,
a is a number from 1 to 500 and
b is a number from 0 to 10.

SUMMARY OF THE INVENTION $R^1$ is an alkyl group with 1 to 4 carbon atoms or a phenyl group. At least 90% of the $R^1$ groups should be methyl groups. It is particularly preferred if all the $R^1$ groups are methyl groups. In many cases however, the compatibility with lacquers can be improved by the introduction of phenyl groups.

From 50 to 99% of the $R^2$ groups can be $R^1$ groups. The remaining $R^2$ groups characterize the organofunctional groups, which are formed in two different ways:

The one organofunctional group, referred to as $R^3$ group, is an ester group of the formula $-(CH_2)_n-CO-OR^5$, wherein n is a number with a value from 3 to 20 and $R^5$ is an alkyl group with 1 to 4 carbon atoms. Preferably, n has a value of 6 to 16 and, in particular, from 8 to 12. $R^5$ preferably is a methyl or ethyl group. Particularly preferred is the $-(CH_2)_{10}CO-OCH_3$ group, which combines good product properties with easy availability. The $R^3$ groups show the desired graded reactivity.

The other organofunctional $R^4$ group is a linear or branched alkyl group with 6 to 30 carbon atoms. This $R^4$ group preferably has 8 to 20 carbon atoms.

In organopolysiloxane which is to be used pursuant to the invention, 1 to 50% of the $R^2$ groups are $R^3$ and $R^4$ groups. The ratio of the $R^3$ groups to the $R^4$ groups should fall within the range of 1:25 to 10:1. However, the condition must be fulfilled that there is at least one $R^3$ group and at least one $R^4$ group in the average organopolysiloxane molecule.

The $R^3$ and $R^4$ can be linked terminally and/or laterally. Organopolysiloxanes with laterally linked $R^3$ and $R^4$ groups are preferred.

The structure of the organopolysiloxane is determined by the value of the subscripts a and b, a indicating the content of difunctional siloxy units and b the degree of branching. The former, a, has a value of 1 to 500 and preferably of 2 to 100, while the latter, b, has a value of 0 to 100 and preferably of 0 to 5.

The compounds can be synthesized by a known procedure by the addition reaction between olefins and unsaturated esters having the formula $CH_2=CH-(CH_2)_{n-2}CO-OR_5$ on one hand and organopolysiloxanes on the other, in which an appropriate portion of the $R^2$ groups is replaced by the H group, in the presence of suitable catalysts, such as platinum compounds, for example, $H_2PtCl_6$, or in the presence of platinum materials applied on carrier material.

The modifying agents pursuant to the invention are generally applied directly on the particles that are to be modified. This can be accomplished by spraying the modifying agents, optionally in the form of concentrated solutions, which necessitates drawing off the solvent. The modification can be brought about by mechanically applying the modifying agent, for example, by stirring, kneading or rolling. It is also possible to disperse the particles to be modified in the organic medium, for example, a binder, vehicle or plasticizer, and to add the modifying agent, pursuant to the invention, in the desired amount to this dispersion.

The modifying agent generally is used in an amount of 0.1 to 5 percent by weight, based on the particles that are to be modified. The addition of 0.3 to 2 percent by weight is preferred.

As fillers, which are to be modified pursuant to the invention, talc, calcium carbonate, dolomite, mica, wollastonite, kaolin, aluminum hydroxide, magnesium hydroxide and aluminum oxide can be used.

Pigments can be white pigments, such as $TiO_2$ pigments or colored pigments, such as $Fe_2O_3$ pigments. As further pigments, tin oxides, chromium oxides, molybdate pigments or also furnace black can be used. A comprehensive list of the pigments or fillers is given in the handbook "Kunststoff-Additive" (Additives for Plastics), 3rd edition, published by Carl Hanser Verlag, 1990, pages 549 ff. and pages 663 ff.

In the following examples, the application properties of the compounds, which are to be used pursuant to the invention, are explained in greater detail, it being understood that the examples are given by way of illustration and not by way of limitation.

APPLICATION EXAMPLES

For the incorporation of pigments and fillers in lacquers, paints and plastics, advantageous rheological properties are expected by the processor. In particular, a low viscosity is desirable when the pigment and filler contents are high.

Pursuant to the invention, the pigments and fillers are treated for 1 hour in mechanical shaker mill (SCANDEX type BAS 20) with 15 mm spheres and 0.2 to 1 percent by weight addition of the organopolysiloxanes. Subsequently, they are dispersed, at first for 1 minute at 2,000 r.p.m. (v=4.25 m/sec) and then for 3 minutes at 4,000 r.p.m. (v=8.5 m/sec), in di-2-ethylhexyl phthalate (DOP) or paraffin oil (30 cp) using a Mizer disk with a diameter of 4 cm.

The viscosities of the resulting dispersions are determined according to the DIN standard 53 019 with a CONTRAVES-RHEOMAT 115 at a measurement temperature of T=25° C. with the MS-DIN 125 measuring system at an r.p.m. of 5.15 and a limiting frequency of 1 Hz.

As coating material, the following modified organopolysiloxane is employed:

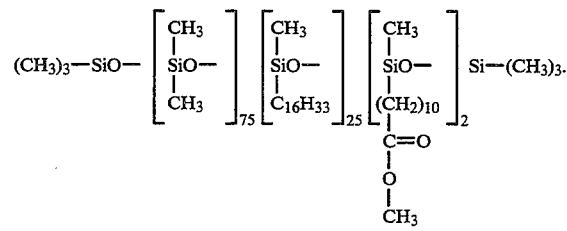

For the comparison experiments, the organopolysiloxane, which corresponds to the state of the art and has the following formula, is used as coating agent:

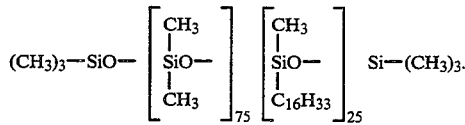

The following fillers were used as base materials for the coating:
magnesium oxide hydrate—$Mg(OH)_2$
aluminum oxide hydrate—$Al(OH)_3$, The dispersions contain 51 percent by weight of $Mg(OH)_2$ or 54 percent by weight of $Al(OH)_3$ in the respective medium. They have the following viscosities in cp.

| | Viscosity in Paraffin Oil | |
|---|---|---|
| 1 percent by weight Addition | | |
| of the invention: | $Mg(OH)_2 = 36,000$ | $Al(OH)_3 = 10,000$ |
| comparison: | $Mg(OH)_2 = >60,000$ | $Al(OH)_3 = 12,000$ |
| 0.5 percent by weight Addition | | |
| of the invention: | $Mg(OH)_2 = 47,000$ | $Al(OH)_3 = 7,300$ |
| comparison: | $Mg(OH)_2 = >60,000$ | $Al(OH)_3 = 7,700$ |
| | Viscosity in DOP | |
| 1 percent by weight Addition | | |
| of the invention: | $Mg(OH)_2 = 10,000$ | $Al(OH)_3 = 2,500$ |
| comparison: | $Mg(OH)_2 = 33,000$ | $Al(OH)_3 = 2,500$ |
| 0.5 percent by weight Addition | | |
| of the invention: | $Mg(OH)_2 = 16,000$ | $Al(OH)_3 = 2,700$ |
| comparison: | $Mg(OH)_2 = 34,000$ | $Al(OH)_3 = 2,900$ |

Uncoated base material, at a concentration of 40 percent by weight of filler in DOP or paraffin oil, has a pasty consistency, whose viscosity cannot be measured.

We claim:

1. A method for modifying the surface of a particle which comprises applying to the particle, an organosiloxane with ester groups and long-chain alkyl groups linked over carbon atoms to silicon atoms and having the general formula $$R^2-\underset{\underset{R^1}{|}}{\overset{\overset{R^1}{|}}{Si}}O-\left[\underset{\underset{R^1}{|}}{\overset{\overset{R^1}{|}}{Si}}O-\right]_a \left[\underset{\underset{R^1-\underset{\underset{R^2}{|}}{\overset{\overset{O}{|}}{Si}}-R^1}{|}}{\overset{\overset{R^1}{|}}{\underset{\underset{O}{|}}{\overset{\overset{SiO-}{|}}{|}}}}{\underset{R^1-\underset{\underset{}{|}}{\overset{\overset{}{|}}{Si}}-R^2}{|}}\right]_b \left[\underset{\underset{R^2}{|}}{\overset{\overset{R^1}{|}}{Si}}O-\right]_a \underset{\underset{R^1}{|}}{\overset{\overset{R^1}{|}}{Si}}-R^2$$

wherein
$R^1$ is an alkyl group with 1 to 4 carbon atoms or a phenyl group, with the proviso that at least 90% of the $R^1$ groups are $CH_3$,
$R^2$ is selected from the group consisting of $R^1$, $R^3$ and $R^4$ with the proviso that 50 to 99% of the $R^2$ groups have the same meaning as $R^1$ the remaining groups being $R^3$ and $R^4$, whereby each $R^3$ is a group of the formula $-(CH_2)_n-CO-OR^5$, where $R^5$ is an alkyl group with 1 to 4 carbon atoms and n is a number from 6 to 16, and $R^4$ is a linear or branched alkyl group with 6 to 30 carbon atoms, with the proviso that
 (a) the ratio of $R^3$ to $R^4$ is within the range of 1:25 to 10:1,
 (b) at least one $R^3$ group and at least one $R^4$ group must be present in the average molecule,
a is a number from 1 to 500, and
b is a number from 0 to 10.

2. The method according to claim 1, wherein the particle is one of the group consisting of pigments, glass fibers, and fillers other than pigments and glass fibers.

3. A preparation for modifying a particle comprising the particle and between 0.1 to 5% by weight, based on the particle to be modified, of the compound of claim 1.

4. A particle modified by the method of claim 1.

* * * * *